United States Patent
Oberpriller et al.

(10) Patent No.: US 11,854,216 B2
(45) Date of Patent: Dec. 26, 2023

(54) IMAGE-BASED JAM DETECTION

(71) Applicant: Banner Engineering Corp., Minneapolis, MN (US)

(72) Inventors: Wade Oberpriller, Minneapolis, MN (US); Paul D. Bratton, Plymouth, MN (US); Jeff Bromen, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 0 days.

(21) Appl. No.: 18/047,958

(22) Filed: Oct. 19, 2022

(65) Prior Publication Data
US 2023/0105280 A1  Apr. 6, 2023

Related U.S. Application Data

(63) Continuation of application No. 17/072,028, filed on Oct. 15, 2020, now Pat. No. 11,521,328.

(Continued)

(51) Int. Cl.
*G06T 7/20* (2017.01)
*G06T 7/246* (2017.01)
(Continued)

(52) U.S. Cl.
CPC .............. *G06T 7/285* (2017.01); *G01S 13/75* (2013.01); *G01S 13/878* (2013.01); *G06T 7/20* (2013.01);
(Continued)

(58) Field of Classification Search
CPC ......... G06T 7/254; G06T 7/246; G06T 7/285; G06T 2207/30112; G06T 2207/30232;
(Continued)

(56) References Cited

U.S. PATENT DOCUMENTS

| 649,833 A | 5/1900 | Gillespie |
|---|---|---|
| 4,258,250 A | 3/1981 | Schmidt |

(Continued)

FOREIGN PATENT DOCUMENTS

| CN | 107861113 B | 1/2020 |
|---|---|---|
| DE | 202014007924 U9 | 5/2015 |

(Continued)

OTHER PUBLICATIONS

U.S. Appl. No. 62/916,087, filed Oct. 16, 2019, Wade Oberpriller.

(Continued)

*Primary Examiner* — Kenny A Cese
(74) *Attorney, Agent, or Firm* — Craige Thompson; Thompson Patent Law; Timothy D. Snowden

(57) ABSTRACT

Apparatus and associated methods relate to a method of non-contact motion detection. A one-dimensional optical sensor detects motion of a target or objects on a conveyor belt through a continuous measurement of targets or objects and a real-time comparison of the pixel images captured by the one-dimensional optical sensor. In an illustrative embodiment, a one-dimensional sensor may be configured to determine motion of objects based on changes to the captured intensities of pixel images over time. The sensor may continually capture photoelectric pixel images and compare a current pixel image with a previous pixel image to determine a frame differential image value. The frame differential image value is evaluated against a predetermined threshold over a predetermined time period. Based on the evaluation, a signal is output indicating whether the objects on the conveyor belt are moving or jammed.

21 Claims, 8 Drawing Sheets

Related U.S. Application Data

(60) Provisional application No. 62/924,020, filed on Oct. 21, 2019, provisional application No. 62/916,087, filed on Oct. 16, 2019.

(51) Int. Cl.
*G06T 7/285* (2017.01)
*G06T 7/254* (2017.01)
*G01S 13/75* (2006.01)
*G01S 13/87* (2006.01)
*G01S 13/00* (2006.01)

(52) U.S. Cl.
CPC .............. *G06T 7/246* (2017.01); *G01S 13/00* (2013.01); *G01S 13/751* (2013.01); *G06T 2207/10016* (2013.01)

(58) Field of Classification Search
CPC . G06T 2207/10016; G06T 7/20; G01S 13/00; G01S 13/75; G01S 13/878; G01S 13/751
See application file for complete search history.

(56) References Cited

U.S. PATENT DOCUMENTS

| | | |
|---|---|---|
| 5,073,706 A | 12/1991 | Kulju |
| 5,914,785 A | 6/1999 | Allison et al. |
| 5,970,433 A | 10/1999 | Oka et al. |
| 6,018,159 A | 1/2000 | Alderman et al. |
| 6,157,040 A | 12/2000 | Bauer |
| 6,498,333 B1 | 12/2002 | Christensen |
| 6,927,385 B2 | 8/2005 | Adamietz et al. |
| 7,414,707 B2 | 8/2008 | LaBelle et al. |
| 7,638,753 B2 | 12/2009 | Merettig |
| 7,855,778 B2 | 12/2010 | Yung et al. |
| 8,820,741 B2 | 9/2014 | Hongo et al. |
| 8,857,815 B2 | 10/2014 | Hongo et al. |
| 9,477,220 B2 | 10/2016 | Shteinfeld et al. |
| 9,752,863 B2 | 9/2017 | Hinderling et al. |
| 10,630,869 B1 * | 4/2020 | Forsythe ................. G06T 7/254 |
| 10,663,567 B2 | 5/2020 | Fenton et al. |
| 10,977,800 B1 * | 4/2021 | Hay ...................... G06T 7/0004 |
| 2006/0144899 A1 | 7/2006 | Hu et al. |
| 2006/0187441 A1 | 8/2006 | Sugiyama et al. |
| 2009/0121886 A1 | 5/2009 | Klaus et al. |
| 2012/0019832 A1 * | 1/2012 | Momtahan ............ G06F 3/0317 356/446 |
| 2012/0235929 A1 | 9/2012 | Hongo et al. |
| 2012/0312956 A1 | 12/2012 | Chang et al. |
| 2012/0327287 A1 | 12/2012 | Meyers et al. |
| 2013/0083316 A1 | 4/2013 | Mimeault et al. |
| 2014/0374569 A1 | 12/2014 | Fuhr |
| 2015/0329296 A1 | 11/2015 | Shteinfeld et al. |
| 2016/0091861 A1 * | 3/2016 | Liu ...................... H04N 13/365 359/9 |
| 2016/0298809 A1 | 10/2016 | Lutz et al. |
| 2018/0120424 A1 | 5/2018 | Eshel et al. |
| 2018/0246189 A1 | 8/2018 | Smits |
| 2018/0275310 A1 | 9/2018 | Hörsch et al. |
| 2018/0284321 A1 | 10/2018 | Lindmark et al. |
| 2019/0049581 A1 | 2/2019 | Waslowski |
| 2019/0285751 A1 | 9/2019 | Hall et al. |
| 2020/0018836 A1 | 1/2020 | Nakamura et al. |
| 2020/0278447 A1 | 9/2020 | Meinherz et al. |
| 2021/0009359 A1 | 1/2021 | Polak et al. |
| 2021/0118154 A1 | 4/2021 | Oberpriller et al. |

FOREIGN PATENT DOCUMENTS

| | | |
|---|---|---|
| DE | 202014103348 U1 | 10/2015 |
| DE | 102016122335 A1 | 5/2018 |
| EP | 0819950 A1 | 1/1998 |
| EP | 2348331 A1 | 7/2011 |
| EP | 3188461 A1 | 7/2017 |
| EP | 2447739 B1 | 9/2018 |
| GB | 2214027 A | 8/1989 |

OTHER PUBLICATIONS

Avago Technologies, "Optical Mouse Sensors." Avago Technologies, 2007, [Online]. https://media.digikey.com/pdf/Data%20Sheets/Avago%20PDFs/ToolKitSelectionGuide.pdf.

Banner Engineering Corp., "LH Series: High Precision Laser Measurement Sensor," n.d. https://www.bannerengineering.com/us/en/products/sensors/laser-distance-measurement/highprecision-laser-measurement-sensors-lh-series.html?sort=4#all (accessed Aug. 31, 2020).

Banner Engineering Corp., "Q4X Laser Distance Sensor: The Ultimate Problem Solver," n.d. https://www.bannerengineering.com/in/en/products/new-products/laser-distance-sensorq4x.html (accessed Aug. 31, 2020).

Earl, B. Calibrating Sensors. Mar. 21, 2020. https://learn.adafruit.com/calibratingsensors/single-point-calibration.

International Search Report and Written Opinion of the International Searching Authority in related International Application No. PCT/US2022/071037, dated May 20, 2022, 11 pages.

International Search Report and Written Opinion of the International Searching Authority in related International Application No. PCT/US2022/071036, dated Jun. 8, 2022, 11 pages.

Keyence, "Best Detection Ability in its Class" LR-Z series Self-contained CMOS Laser Sensor, Sep. 2013, https://www.keyence.com/products/sensor/photoelectric/lr-z/features/feature-02.jsp.

Lee, S.; Paik, J.; Hayes, M. Stereo Image Capture and Distance Estimation with an SLR Digital Camera. In Modelling and Simulation / 804: Signal and Image Processing;ACTAPRESS: Banff, Canada, 2013. https://doi.org/10.2316/P.2013.804-029 http://www.actapress.com/PaperInfo.aspx.

Lezhin, et al. "Comparison of Different Methods of Non-contact Vibration Measurement," Procedia Engineering, vol. 176, pp. 175-183, 2017, doi: 10.1016/j.proeng.2017.02.286.

Lindner, M.; Kolb, A. Calibration of the Intensity-Related Distance Error of the PMD TOFCamera, in Proceedings of SPIE; 2007; vol. 6764., https://doi.org/10.1117/12.752808. https://www.researchgate.net/profile/Andreas-Kolb-3/publication/241478403_Calibration_of_the_intensityrelated_distance_error_of_the_PMD_TOFcamera/links/0046352dff2a703a66000000/Calibration-of-the-intensity-related-distance-error-ofthe-PMD-TOF-camera.pdf.

Lindner, M.; Kolb, A.; Ringbeck, T. New Insights into the Calibration of ToF-Sensors; 2008, p. 5. https://doi.org/10.1109/CVPRW.2008.4563172.https://www.researchgate.net/publication/224320543_New_insights_into_the_calibration_of_ToF-sensors.

Omron, Overview of Photoelectric Sensors | OMRON Industrial Automation, Jan. 27, 2022, https://www.ia.omron.com/support/guide/43/introduction.html.

S. Alavi, "Comparison of Some Motion Detection Methods in cases of Single and Multiple Moving Objects," International Journal of Image Processing, vol. 6, No. 5, pp. 389-396, 2012, [Online]. Available: https://www.researchgate.net/publication/306357420_Comparison_of_Some_Motion_Detection_Methods_in_cases_of_Single_and_Multiple_Moving_Objects.

Tripathy, et al., "Adaptive Threshold Background Subtraction for Detecting Moving Object on Conveyor Belt," International Journal of Students' Research in Technology & Management, vol. 5, No. 4, pp. 46-51, Nov. 2017, doi: 10.18510/ijsrtm.2017.546.

\* cited by examiner

IMAGE-BASED JAM DETECTION

CROSS-REFERENCE TO RELATED APPLICATIONS

This application is a continuation application and claims the benefit of U.S. application Ser. No. 17/072,028, titled "Imaging System Using Triangulation," filed by Banner Engineering Corp., on Oct. 15, 2020.

This application also claims the benefit of U.S. Provisional Application Ser. No. 62/916,087 titled "IMAGING SYSTEM USING TRIANGULATION," filed by Banner Engineering Corp. on Oct. 16, 2019. This application also claims the benefit of U.S. Provisional Application Ser. No. 62/924,020 titled "IMAGING SYSTEM USING TRIANGULATION," filed by Banner Engineering Corp. on Oct. 21, 2019.

This application incorporates the entire contents of the foregoing application(s) herein by reference.

TECHNICAL FIELD

Various embodiments relate generally to non-contact motion detection and more specifically to a system and method of motion detection for conveyors.

BACKGROUND

Conveyor belts typically transport objects from a first location to a second desired location. Many different types of conveyor belts exist. For example, conveyor belts may consist of surfaces that include rollers, wheels, belts that may be webbed or textured, or some other surface that would easily enable the movement of materials or objects from one place to another. The objects being transported may be varied. For example, objects may be non-uniform, such as individual boxes of varying sizes and shapes, or continuous and uniform, such as a long roll of paper or paper towels.

Conveyor belt applications typically monitor the progress of objects on a conveyor belt. Specifically, conveyor belt applications may need to determine whether a flow of objects along the conveyor belt are moving freely or if the objects are stopped and no longer moving or jammed In some cases, the determination of flow of objects on the conveyor belt involves direct human intervention by a user. For example, the user may directly observe the objects as they move along the belt from one point to another. In other cases, the monitoring of object flow may be done by a camera-based system that records the movement of the objects as they are transported along the conveyor belt.

It may be especially challenging to determine whether or not objects on a conveyor belt are moving or are jammed in cases where objects on the conveyor belt are continuous or uniform rather than discrete and non-uniform in size and/or shape. For example, it may be more difficult to detect whether a long roll of paper or paper towels are continuing to move along a conveyor belt or are stopped as opposed to individual boxes of varying sizes and shapes.

SUMMARY

Apparatus and associated methods relate to a method of non-contact motion detection. A one-dimensional optical sensor detects motion of a target or objects on a conveyor belt through a continuous measurement of targets or objects and a real-time comparison of the pixel images captured by the one-dimensional optical sensor. In an illustrative embodiment, a one-dimensional sensor may be configured to determine motion of objects based on changes to intensities of the captured pixel images over time. The sensor may continually capture photoelectric pixel images and compare a current pixel image with a previous pixel image to determine a frame differential image value. The frame differential image value is evaluated against a predetermined threshold over a predetermined time period. Based on the evaluation, a signal is output indicating whether the objects on the conveyor belt are moving or jammed.

Various embodiments may achieve one or more advantages. For example, in one exemplary aspect, a cost-competitive and economical advantage results from using a minimal amount of hardware for jam detection. For example, a single optical imaging source, such as a one-dimensional sensor, may launch a linear optical beam that illuminates a target object being transported by a conveyor system and generate a detection signal as a function of a reflection of the linear optical beam off the target object and incident on a corresponding detection surface. The detection signal may indicate whether the object is jammed or moving. The only hardware required for achieving detection results is the optical imaging source which may include both a laser and linear imager for a measurement of distance and pixel intensity and the processing engine. In some embodiments, steps of a method may advantageously provide for image processing to determine motion based on sensor measurements of a frame differential image (FDI) without regard to distance.

In some embodiments, a FDI value may indicate a measure of movement of the target object from the first detection time to the second detection time. Some embodiments may generate a jam detection signal only if a received pixel signal strength and/or distance measurement is within a predetermined qualified range. This may reduce, for example, false detections of jams.

In another exemplary aspect, a further advantage may be the easy detection of movement of uniform and/or light-colored objects, dark-colored objects or even multi-colored objects on a conveyer belt. This may be accomplished by a processor programmed with instructions to operate an algorithm that compares differences in pixel signal strength. For example, the algorithm may include operations that sum the square of the differences in pixel signal strength to produce a residual difference that may indicate a motion or jam state over a predetermined time period.

The details of various embodiments are set forth in the accompanying drawings and the description below. Other features and advantages will be apparent from the following detailed description taken in conjunction with the accompanying drawings

BRIEF DESCRIPTION OF THE DRAWINGS

For a more complete understanding of the disclosure and the advantages thereof, reference is now made to the accompanying drawings wherein similar or identical reference numerals represent similar or identical items.

DETAILED DESCRIPTION OF ILLUSTRATIVE EMBODIMENTS

To aid understanding, this document is organized as follows. First, an exemplary use case of a scanner deployed to detect motion of a conveyor belt is briefly introduced with reference to FIG. 1. Next, with reference to FIG. 2, a discussion of a top-level operation of jam detection engine with the scanner is presented. With reference to FIGS. 3A-3E, the discussion details the method of image processing that determines motion based on sensor measurements of a frame differential image (FN). Turning to FIGS. 4A and 4B, the graphical output of the amount of change detected between pixel images and its relevance to motion detection is discussed. A discussion of the motion detector outputs that indicates whether or not a jam exists is presented with respect to FIG. 5. With reference to FIG. 6, the process of motion detection according to embodiments of the disclosure is discussed. Finally, a review of an exemplary system that may implement the process of jam detection is presented with reference to FIG. 7.

In embodiments of this disclosure, an optical imaging source, such as a sensor device having a plurality of photoelectric receiving elements or pixels, scans target objects moving on a conveyor belt and creates a one-dimensional array. The one-dimensional pixel array is processed by a monitor system and determines one or more FDI values of the pixel images to determine whether the target objects are moving on the conveyor belt or the target objects are jammed.

In various embodiments, the sensor may include a laser and a one-dimensional linear imager. The signal strength of each pixel image across the one-dimensional linear imager scan may be measured. The sensor may then process the difference between the pixel signal strengths over time to determine whether an object is moving continuously on a conveyor belt. In some embodiments, a distance may be measured through the laser by optical triangulation which determines object position by measuring light reflected from the target object. The sensor may then process the difference between the pixel signal strengths and/or distances over time to determine whether an object is moving continuously on a conveyor belt.

Figure 1:
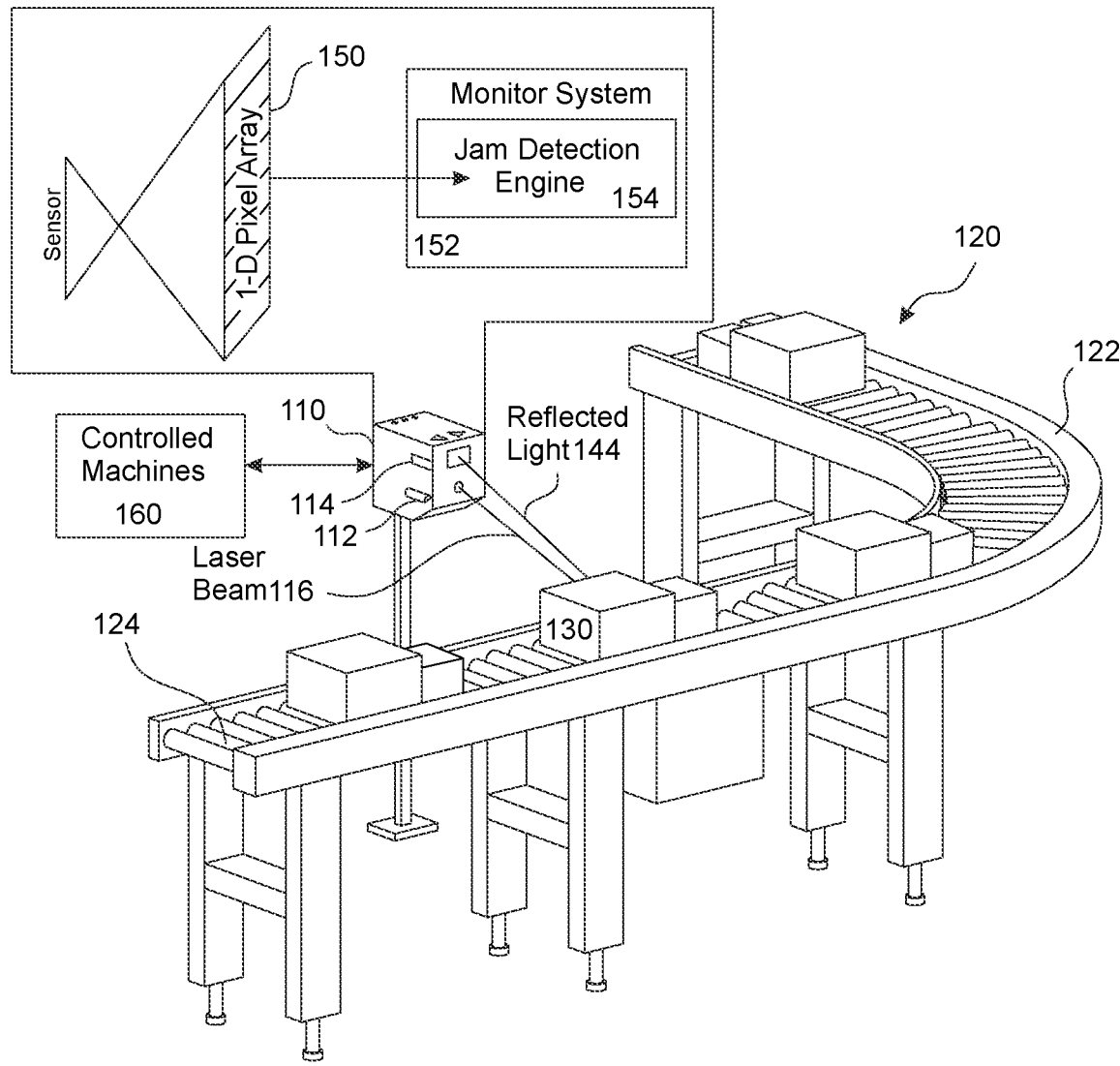
FIG. 1 depicts a view of an exemplary implementation of a system for motion detection.

FIG. 1 depicts a view of an exemplary implementation of a system for motion detection. In this embodiment, an optical imaging source or sensor 110 is illustrated as operating on objects, such as object 130, moving along a conveyor belt 124 of a conveyor 120. The sensor 110 may include a laser 112 and a linear imager 114. The linear imager 114 may be one-dimensional and include a single line of photoelectric receiving elements (PERE) or pixels. Photoelectric receiving elements may be associated with corresponding pixels. By way of example, and not limitation, the number of individual photoelectric receiving elements or pixels in linear imager 114 may number around 640.

The conveyor 120 may consist of a frame 122 that supports the conveyor belt 124. The conveyor 120 may vary in width to accommodate target objects of varying sizes that may pass singularly, in tandem, or side-by-side along the conveyor belt 124 in front of the sensor 110.

In operation, the sensor 110 is parallel to the conveyor 120 and may project a beam of light 116 along the conveyor belt 124. The beam of light 116 may be a diffuse light that is generated from a light emitting device such as laser 112. The beam of light 116 is directed onto target objects, such as object 130, as they move along the conveyor belt 124 and pass in front of sensor 110. The beam of light 116 reflects off the conveyor belt objects and the reflected light 144 forms a one-dimensional array of signals on the pixels or PERE of the linear imager 114. Each signal of the one-dimensional signal array has an intensity or strength that may be measured by the linear imager 114.

The sensor 110 may be a triangulation sensor configured by a microcontroller or processor to detect conveyor belt motion. In an illustrative embodiment, a processor within the sensor 110 may control a monitor system 152 configured to determine whether objects on a conveyor belt are moving or jammed In this disclosure, the illustration of the monitor system 152 is not meant to imply physical or architectural limitations. Different implementations may be possible as may be obvious to one skilled in the art. The monitor system 152 may include a jam detection engine 154. Jam detection engine 154 may output one or more signals that indicate the state of the conveyor belt 124 as moving or jammed. The signals may be sent to one or more machines 160 that may activate a response based on the output state received from the jam detection engine 154. In some embodiments, the output of the jam detection engine 154 may be sent to controlled machines 160 for further action. For example, the output of the jam detection engine 154 may be sent to alert a user to manually intervene and clear the jam state. In other embodiments, the output of the jam detection engine 154 may be used to operate some other device, including, but not limited to, a plunger, to remove the cause of the jam state.

Figure 2:
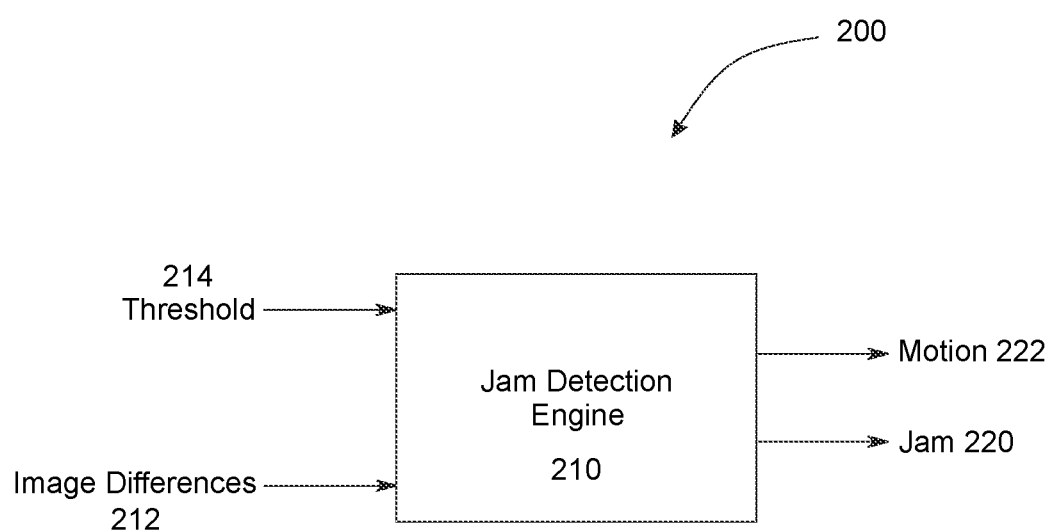
FIG. 2 depicts a top-level block diagram of an exemplary jam detection engine.

FIG. 2 depicts a top-level block diagram of an exemplary jam detection engine. In FIG. 2, the jam detection engine 210 may input image difference signals 212. The image difference signals 212 are determined by a detection signal analysis that compares an amount of change detected for an image at two discrete time intervals. The jam detection engine 210 may also input threshold 214. The threshold 214 may function as a user-defined sensitivity setting. Jam detection engine 210 may compare the image difference signals 212 to the threshold 214 setting to determine whether a conveyor belt is in a moving or jammed state. Based on the determination, the jam detection engine 210 may output a jam 220 or motion 222 signal.

The threshold 214 is a sensitivity setting parameter that may be adjusted. In some embodiments, the adjustment of threshold 214 may be done by a user input control, for example and without limitation, an adjustment knob, on the jam detection engine that may be dialed upward or downward. The threshold 214 may be adjusted based on user requirements or sensitivity requirements. For example, the threshold may be lowered if greater sensitivity is needed to be able to detect a motion state. Alternatively, the threshold may be increased for less sensitivity to decrease the possibility non-detection of a jam state. For example, in a scenario where a conveyor belt may experience significant amounts of vibration that causes the objects on the conveyor belt to be moved around a lot during a jam, a user may set the threshold to a high setting to prevent a non-detection of a jam state.

FIGS. 3A-3E depict graphs of exemplary light intensity for each pixel image captured by the sensor 110 of FIG. 1 to illustrate the processing steps for jam detection. In the graphs of FIGS. 3A-3E, the X-axes may represent a pixel number in a one-dimensional array of PERE or pixels of a sensor. The Y-axes may represent an amplitude or magnitude of the actual signal corresponding to the individual pixel. The amplitude or value of the signal shown on the Y-axis may be a measure of the signal intensity. The signal value is based on light reflected back to an imager of a sensor, such as imager 114 of sensor 110 illustrated in FIG. 1.

Figure 3A:
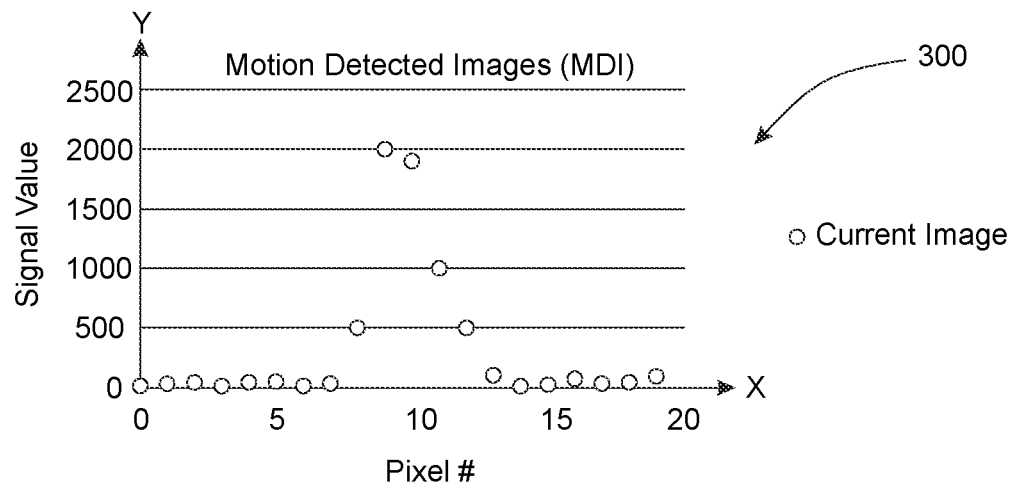
FIGS. 3A-3E depict graphs of exemplary light intensity for each pixel image captured by the sensor of FIG. 1 to illustrate the processing steps for jam detection.
Figure 4A:
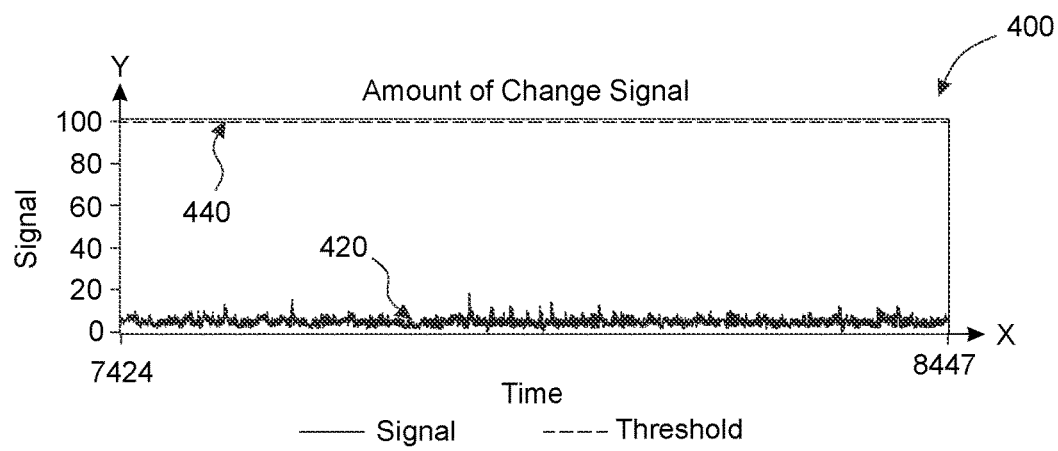
FIG. 4A depicts a graphical output of an exemplary amount of change calculated between pixel image signals.
Figure 4B:
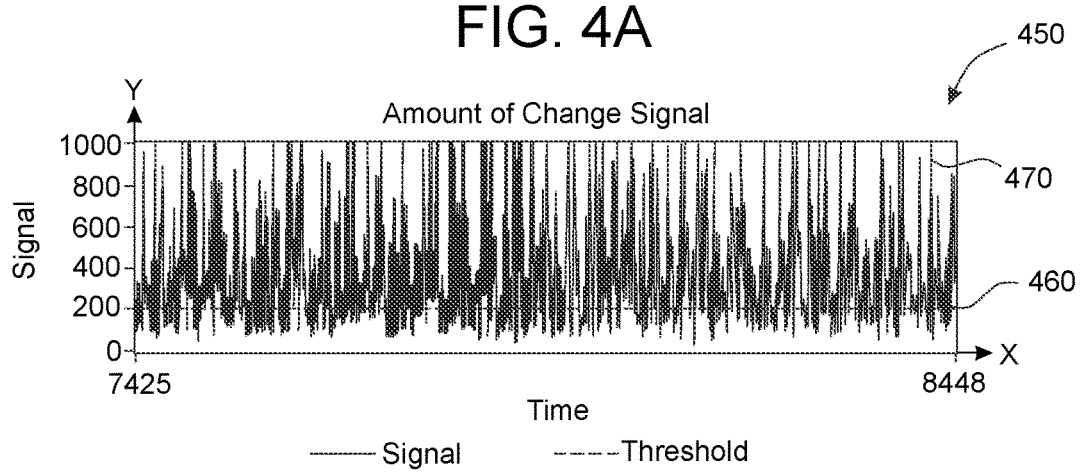
FIG. 4B depicts a graphical display of an exemplary amount of change for a moving object as compared to a predetermined threshold.

In the embodiment of FIG. 3A, it may be observed from the X-axis that the linear pixel array numbers about twenty pixels. However, only about seven pixels, starting at about pixel eight through about pixel thirteen have a signal value that indicates a light or signal intensity. The amplitude of the signal is a measure of the signal intensity. The signal value is based on light reflected back off of an object onto the imager.

It must be understood that the depicted graphs, starting at FIG. 3A, do not take into account background light that may not be a direct result of reflected light coming directly back into the imager, such as ambient or scattered light. In embodiments of this disclosure, ambient or scattered light is automatically excluded from consideration by the sensor. The light exclusion may be performed by the sensor prior to a laser or other optical imaging source launching or emitting an optical beam. The sensor may take a sample or snapshot of light received on the one-dimensional array prior to the firing of the laser. The pixel values of the received light are then subtracted out from the pixel values of the reflected light after the emission of the optical beam. As a result, the pixels of the array that do not directly receive any reflected light may have a value of around zero.

Figure 3B:
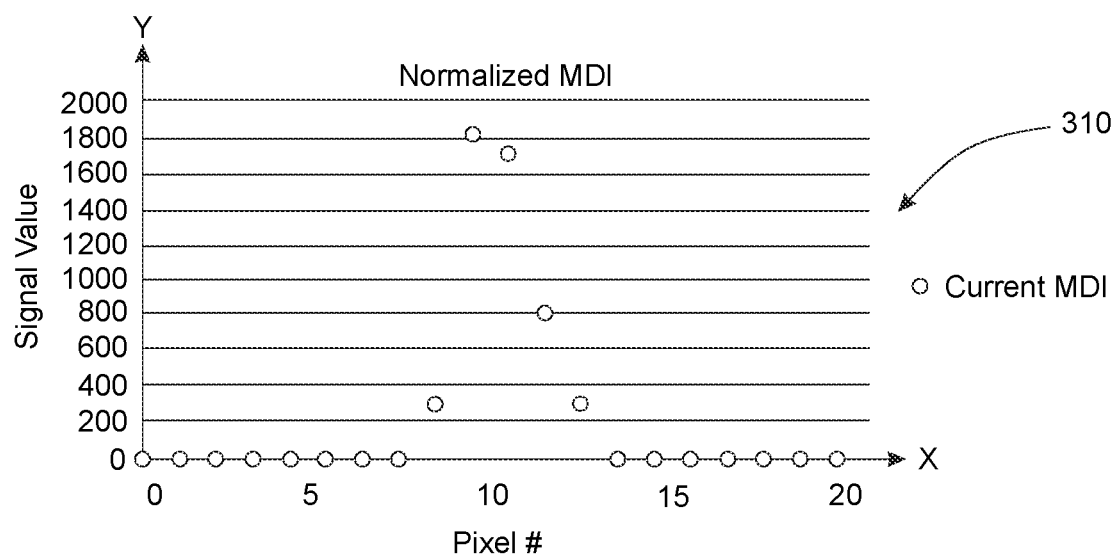

FIG. 3B illustrates a general profile of an object formed by pixel images resulting from light reflected off the imager by the object. In FIG. 3B, the signal values of each pixel are normalized so that the value of any pixel that does not receive light is set to zero and ignores ambient light. The profile generated by the object may depend on the optical system which receives the light that is reflected. In some embodiments, the reflected light may result in a profile that may be generally bell-shaped or Gaussian. In other embodiments, the profile generated may depend on the surface of the object or target. For example, a diffuse target provides a smooth response.

The pixel values may be normalized based on the setting used by the sensor to capture the image. The exposure rate used by the sensor automatically changes depending on the distance of the sensor from the object and the color of the object as a normal part of the triangulation algorithm of the sensor. In embodiments that feature a triangulation-based sensor, the amplitude of the signal may be automatically adjusted with respect to dark or light objects for purposes of more accurately determining distance.

For example, if two dark targets are far from the imager, the sensor exposure rate may need to be increased in order for the sensor to determine the presence of the target. Alternatively, if two white targets are really close to the imager, then the sensor exposure rate may need to be decreased or turned down. If only one exposure rate existed for the sensor, it may be difficult to recognize dark targets at a distance. Some embodiments may undo the output of the triangulation algorithm, for example, and normalize the amplitude based on the setting used by the sensor that may be set by a user.

Figure 3C:
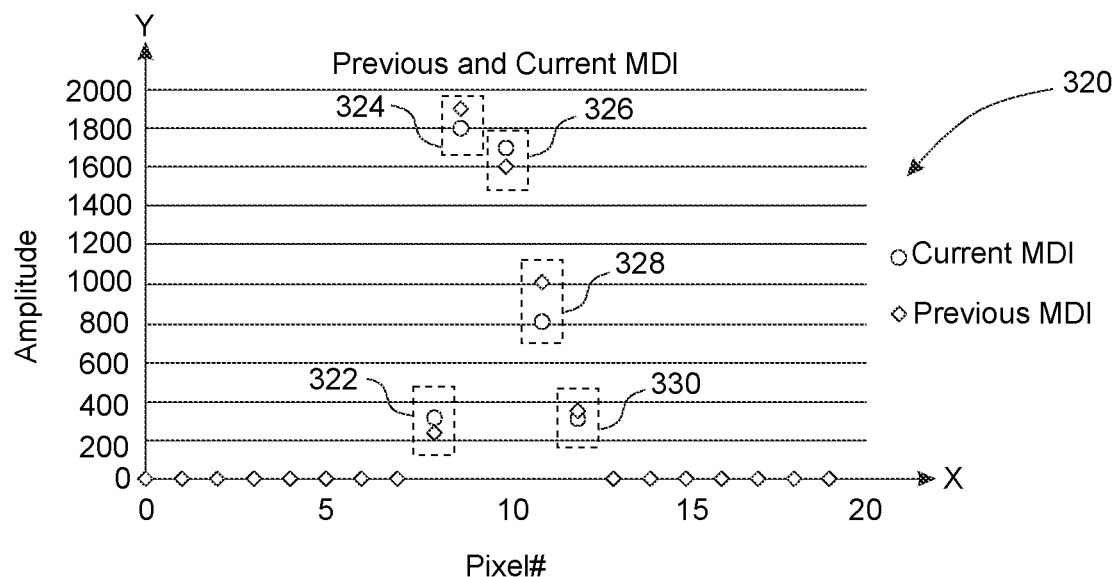

Turning now to FIG. 3C, a graph 320 illustrates a comparison of a previous image in time with a current image on a pixel-by-pixel basis. In FIG. 3C, the comparison shows amplitude differences between two images or objects. As illustrated in the graph 320 of FIG. 3C, at 322, pixel 8 at a first point in time of the current image is brighter than pixel 8 of the current image at a second point in time. Therefore, the current image has a larger amplitude or signal value. At 324, pixel 9 of the current image at a first point in time is darker than pixel 9 of the current image at a second point in time. Therefore, the current image at a second point in time has a smaller value. A difference in distance between the current image at a first point in time and the current image at a second point in time would be illustrated by a difference in alignment between the pixels. The jam detection engine is responsive to any change between pixels and processes amplitude differences or distance differences in the same way.

Figure 3D:
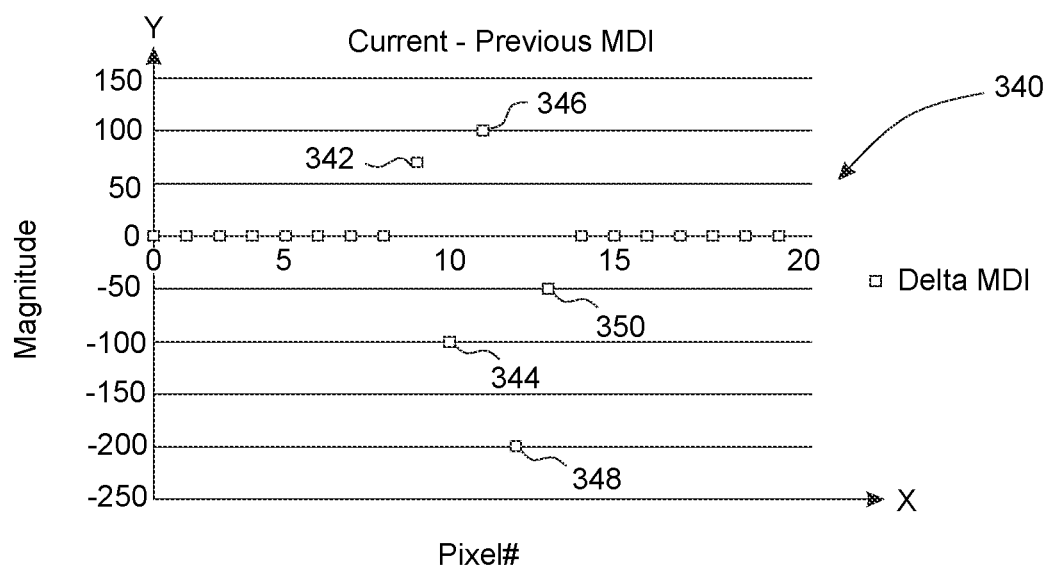

Turning now to FIG. 3D, the process calculates a residual difference, in magnitude on a pixel-by-pixel basis, of the pixel image at a first time period from the pixel image at a second time period. In the graph 340 of FIG. 3D, for example, the residual differences illustrated at 342, 344, 346, 348 and 350 correspond, respectively, to the differences between the pixels illustrated in the graph 320 of FIG. 3C at 322, 324, 326, 328, and 330.

In varying embodiments, the varying amplitude of the pixels may provide an indicator of a motion state. For example, in the graph 340 of FIG. 3D, pixels that have a signal value as indicated by the Y axis may be characterized as an object in motion since the amplitude of the pixels are varying. Alternatively, a continuous amplitude of around zero may indicate that a jam state exists.

The process continues with squaring each residual difference calculated in FIG. 3D to produce a positive real number for each pixel that represents the amplitude of the pixel. The square of the difference accentuates or increases the contrast or difference between two images. The amplitude of each of the pixels in the image are then summed together to produce a single amplitude or a single dimensional variable. The process may then use some other normalization function to normalize the noise produced by an object close to the sensor versus an object at some distance away from the sensor. For example, the sum of the square of the differences may be normalized by dividing out the number of active pixels.

Figure 3E:
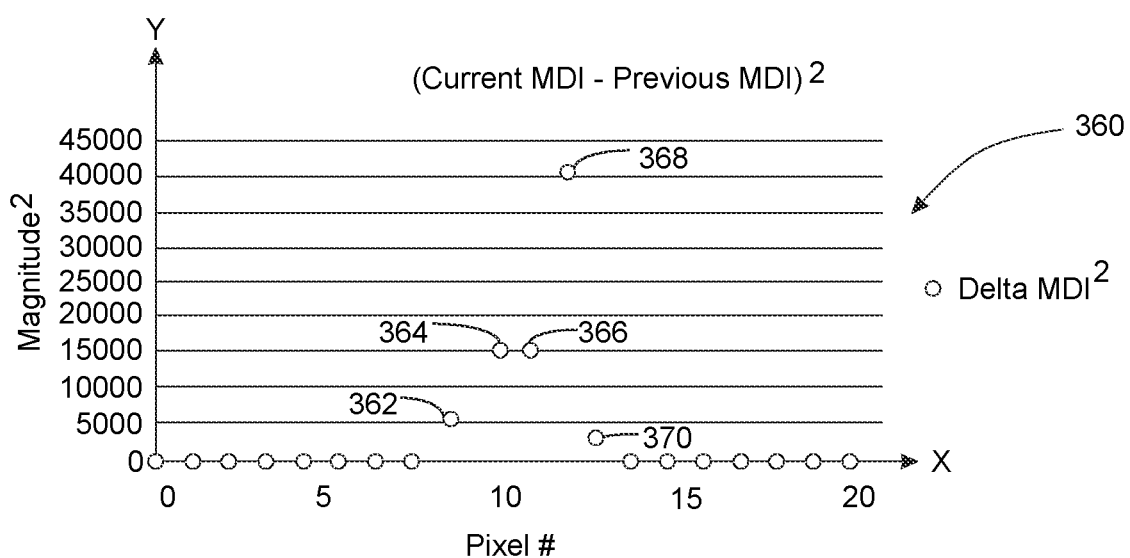

Referring now to FIG. 3E, the graph 360 illustrates the magnitude squared of each of the pixels at two different times. Some of the magnitudes of each pixel shown in graph 360 represents the signal of amount of change between the two different times. The pixels in graph 360, representing the sum of the square of the differences between pixels, correspond to the pixels illustrated in graph 340 of FIG. 3D. For example, pixels 362, 364, 366, 368, and 370 of graph 360 of FIG. 3E correspond, respectively, to pixels 342, 344, 346, 348, and 350 of graph 340 of FIG. 3D.

In an illustrative example, FIG. 4A illustrates a graph of the sum of the square of the differences, on the Y axis, versus time, on the X axis, when a target may be moving. Conversely, FIG. 4B illustrates a graph of the sum of the square of the differences when a target may be moving.

FIG. 4A represents an amount of change in amplitude in time between a current target and a previous target. In FIG. 4A, the graph 400 illustrates the calculated amount of change for a target that is stationary. For a stationary target, the change in the signal 420 may be relatively zero, for example, responsive only to substantial measurement noise, and therefore the signal difference would be small as compared to a pre-determined threshold 440 setting. Each point along the X-axis of the graph 400 represents the calculated amount of change that is derived from the sum of squares of the differences with any normalized amplitude correction. Each point represents how much the current image is different from the previous image.

FIG. 4B depicts a graphical display of the amount of change as compared to a predetermined threshold. The threshold 460 is a user-defined sensitivity setting. In FIG. 4B, the graph 450 illustrates the calculated amount of signal 470 change for a target that is moving past the sensor. The motion state is indicated by the amount of signal 470 change being consistently above the threshold 460 setting. A jam state is indicated when the amount of change is consistently below the threshold 460 setting. The threshold 460 may be adjusted upwards or downwards depending on the application and the amount of sensitivity that may be needed to detect a motion state or a jam state. For example, the threshold 460 may need to be adjusted to a high setting in a case where there may be a lot of vibration on a conveyor belt and objects on the conveyor belt may be jostling around in order to avoid non-detection of a jam state.

The amount of large and sporadic amounts of change illustrated in FIG. 4B accounts for object contrasts or differences including, but not limited to, laser speckling, object wobble, inherent color differences of an object, object distance from the sensor. The system keeps track of how often the change in amplitude is above or below the threshold setting. A consistently low amount of change that is below the threshold indicates a jam state of the conveyor belt. A consistently sporadic or large amount of change above the threshold indicates a motion state of the conveyor belt.

Figure 5:
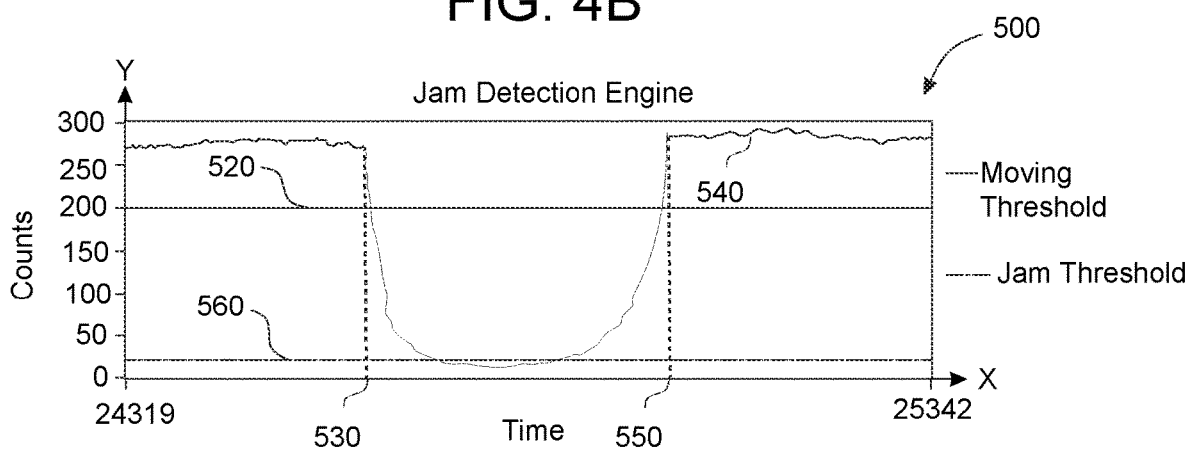
FIG. 5 depicts a graphical display of an exemplary jam detection process.
Figure 6:
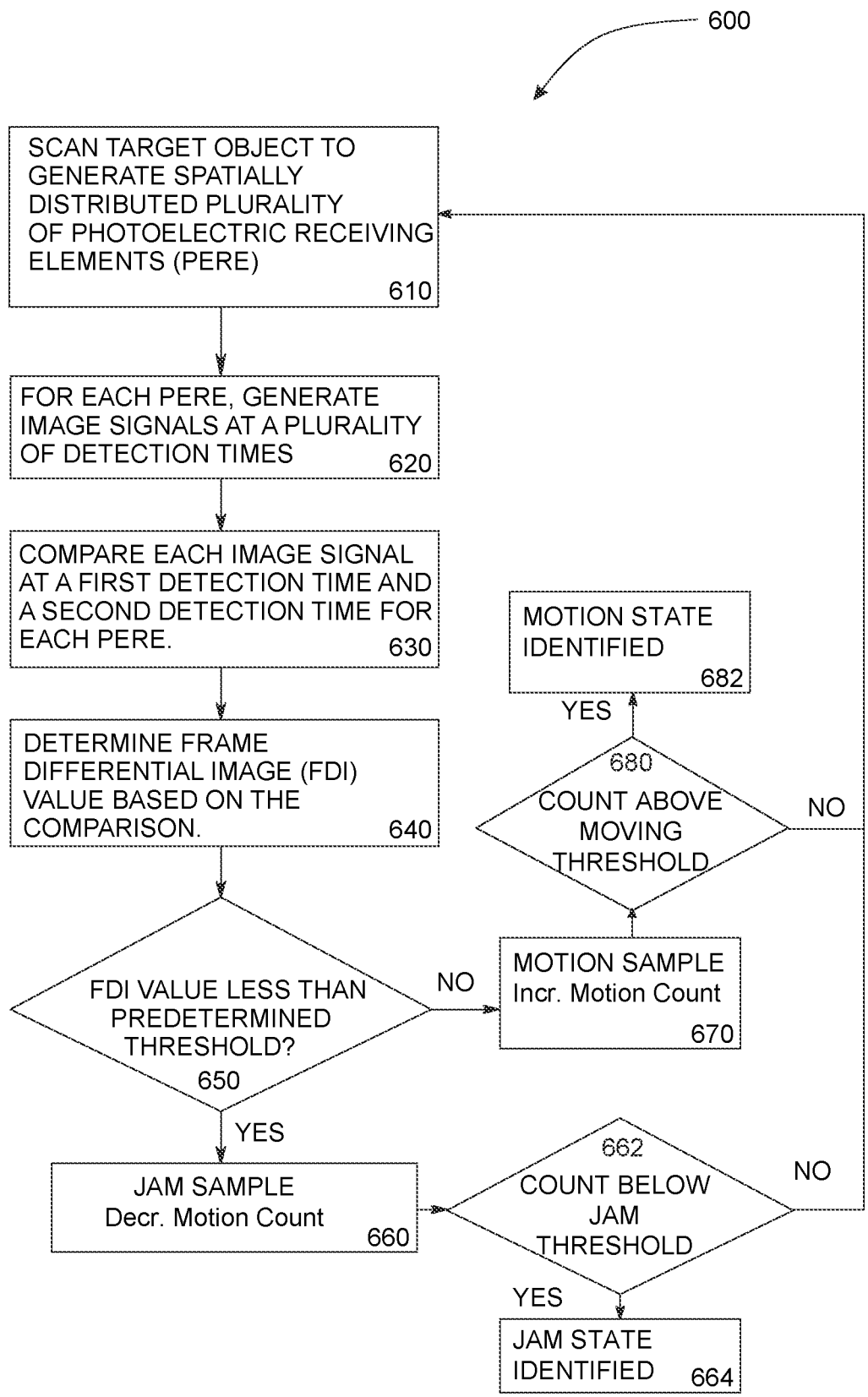
FIG. 6 depicts a flowchart detailing an exemplary process of motion detection.

FIG. 5 depicts a graphical display of an exemplary jam detection process. In FIG. 5, the signal 540 may represent an actual number of counts within a predetermined timeframe. At a point in time, such as at 530, the count may fall below a moving threshold 520 to signal a possible jam. However, when the count falls below a jam threshold 560 for a predetermined period of time, a jam state may be indicated. The indicator of a jam state may include, for example, without limitation, a visual or audible alert or similar operator notification. Similarly, for example, at a point in time 550 when the count signal 540 increases above the moving threshold 520, a state of motion may be signaled.

FIG. 6 depicts a flowchart detailing an exemplary process of motion detection. The process begins at 610 where a plurality of photoelectric receiving elements or image pixels are captured by the image scan of an object over a predetermined time period. The image signal may provide an indication of the distance of the target. At 620, for each of the plurality of image pixels, an image signal is generated so that a current pixel image value is compared to a predetermined minimum value. A frame differential image value (FDI) is determined based on the comparisons at 640. At 640, the difference between a current FDI value and a previous FDI value is determined. At 650, the difference is compared with a predetermined threshold. If the FDI value is less than the predetermined threshold at 650, a Jam sample signal may be output to a demodulation counter state machine and at 660 the motion count is decremented. If the FDI value is not less than the predetermined threshold, then a Motion sample signal is output to a demodulation counter state machine and at 670, the motion count is incremented.

The demodulation counter state machine keeps count of the number of motion signals over a configurable history of time. At 680, if the motion count exceeds a motion threshold, then at 682 the sensor outputs a moving state on a discrete output. At 662, if the motion count falls below the jam threshold, then at 664, the sensor outputs a jam state on a discrete output. In some embodiments, the sensor may not enforce any specific action when in a jam or motion state. The sensor may just indicate the existence of a jam state or motion state (e.g., by generating and transmitting an alarm signal) for further action.

Figure 7:
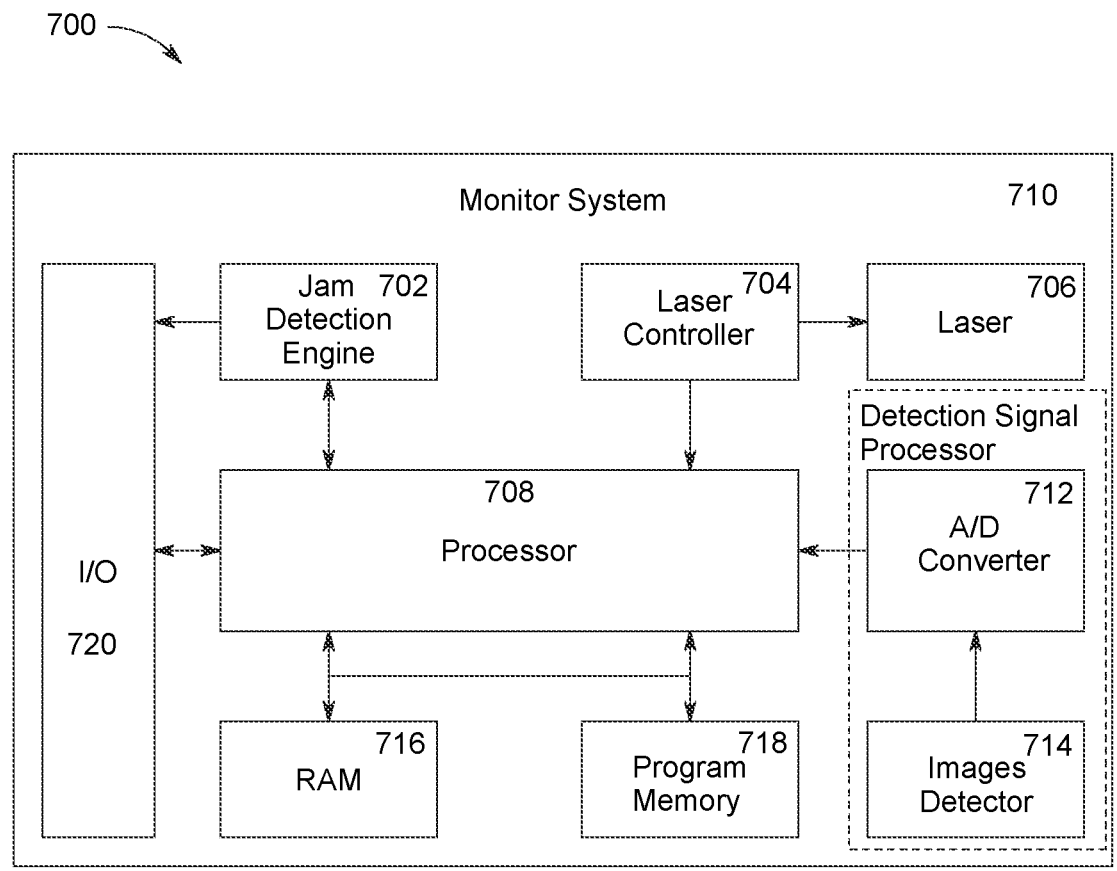
FIG. 7 depicts a block diagram of an exemplary system environment.

FIG. 7 depicts a block diagram of a computer system environment 700 that may be operable for various embodiments of the disclosure. In an illustrative embodiment, computer system environment 700 includes a monitor system 710. Monitor system 710 may include a jam detection engine 702 and detection signal processor 722. In some embodiments, detection signal processor 722 may include an A/D converter 712 and images detector 714. Other modules may be included such as a processor 708, a program memory 718, RAM 716, a laser controller 704, a laser 706, and I/O 720. Those skilled in the art will appreciate that computer system environment 700 is illustrative and not intended to limit the scope of embodiments. Specifically, computer system environment 700 may include fewer or more components than shown in FIG. 7 to perform the methods described.

In particular, the computing system and devices may include any combination of hardware and/or software that can perform the indicated functions, including computers, application specific integrated circuits (ASICs), field programmable gate arrays (FPGAs), network devices, and internet applications, including, for example and without limitation, web-based applications. The computer system environment may also be connected to other devices that are not illustrated, or instead may operate as a stand-alone system. In addition, the functionality provided by the illustrated components may in some embodiments be combined with fewer components or distribute in additional components. Similarly, in some embodiments the functionality of some of the illustrated components may not be provided and/or other additional functionality may be available.

In some embodiments, the jam detection engine 702 may include a counter which keeps track of the number of times over a predetermined time period that the amplitude is greater than the threshold setting. The predetermined time period may be programmed or set by a user to represent a finite period of time over which the count response is evaluated. The evaluation of the count response may be used to determine whether or not a jam state or a motion state exists. The counter may be incremented each time the amplitude is greater than the threshold setting and decremented each time the counter is less than the threshold setting.

Those skilled in the art will also appreciate that, while various items are illustrated as being stored in memory or a data store, these items or portions of them may be transferred between memory and other storage devices for purposes of memory management and data integrity. Alternatively, in other embodiments, some or all of the software components may execute in memory on another device and communicate with the illustrated computing system via inter-computer communication.

Those skilled in the art will also appreciate that in some embodiments the functionality provided by the methods and systems discussed above may be provided in alternative ways, such as being split among more software modules or routines or consolidated into fewer modules or routines. Similarly, in some embodiments, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners.

Although a number of embodiments have been described with reference to the Figures, it will be understood that various modifications may be possible. For example, although the current disclosure describes a predetermined threshold as being a setting that is user-defined, a user may establish a threshold setting in a learn mode of the monitor system and forget it. Advantageous results may be achieved if the threshold setting is automatically adjusted by the monitor system after the initial setting to more finely calibrate a threshold setting. In another advantageous modification, the monitor system may be configured to learn the criteria that identifies a motion state, establish the learned criteria as a baseline to detect motion and automatically calibrate a threshold based on the learned criteria. In yet another advantageous embodiment, the monitor system may be configured to enable both a user-defined threshold and a machine learned threshold.

In one exemplary aspect, an apparatus may include an optical imaging source adapted to launch an optical beam to illuminate a target object being transported by a conveyor system; a spatially distributed two or more photoelectric receiving elements (PERE), each of the plurality of PERE arranged to generate a detection signal at least as a function of an intensity of a reflection of the linear optical beam off of the target object and incident on a corresponding detection surface of each of the plurality of PERE; a detection signal processing module operatively coupled to receive, from each one of the plurality of PERE, the corresponding generated detection signal at each of a plurality of temporally-spaced detection times, and to generate an image signal indicative of a motion of the target object based on the generated detection signals; a processor operatively coupled to receive, from the detection signal processing module, the image signals generated for each of the plurality of PERE; and, a data store operatively coupled to the processor and containing instructions that, when executed by the processor, cause the processor to perform operations to detect a jam state of the target object being transported by the conveyor system. The operations may include (a) receive, for each of the two or more PERE, the image signal at a first one of the detection times and the image signal at a second one of the detection times; (b) for each of the plurality of PERE, compare the image signal at the first detection time to the image signal at the second detection time; (c) based on the comparison, determine a frame differential image (FDI) value indicative of a measure of movement of the target object from the first detection time to the second detection time; and, (d) if the determined FDI value is less than a predetermined threshold, then generate a jam detection signal.

In some embodiments, the operations may further include: (c1) repeating steps (a)—(c) at least a predetermined number of times to determine an FDI value as a function of each of the FDI determinations.

In some embodiments, the detection signal processing module may further generate, for each of the plurality of PERE, the image signal by subtracting an ambient light level associated with background light incident on the corresponding detection surface.

In some embodiments, comparing the image signal at the first detection time to the image signal at the second detection time additionally may include summing the squares of the differences between each of the respective image signals at the first detection time to the corresponding image signals at the second detection time. In some embodiments, the optical imaging source may further include a one-dimensional laser source.

In some embodiments, the operations may further include receiving, via the spatially distributed plurality of photoelectric receiving elements (PERE), a distance measurement to the target object. In other embodiments, the operations additionally include generating the jam detection signal only if the received distance measurement to the target object is within a predetermined qualified range.

In some embodiments, subtracting the ambient light level associated with background light incident on the corresponding detection surface may include adjusting the image signal value to zero if the image signal is less than a predetermined minimum signal threshold for each of the image signals associated with each of the plurality of the PERE.

In some embodiments, the image signal value may be adjusted to zero if the image signal is less than a predetermined minimum signal threshold.

In some embodiments, the operation to determine a frame differential image (FDI) value may further comprise normalizing the FDI as a function of the number of the image signal values that are non-zero.

In some embodiments, each of the generated detection signals may further be a function of an intensity of the corresponding reflection of the linear optical beam off of the target object. In some embodiments, each of a plurality of temporally spaced detection times may further include a corresponding time interval during which each of the corresponding detection signals are generated.

In some embodiments, the spatially distributed plurality of photoelectric receiving elements (PERE) may include a linear array of PERE. In some embodiments, the spatially distributed plurality of photoelectric receiving elements (PERE) may further include a two-dimensional array of PERE.

In some embodiments, the detection signal processing module may further include an analog-to-digital converter. In some embodiments, the detection signal processing module and the processor may further comprise a microcontroller.

In one exemplary aspect, a monitor system for non-contact motion detection may include a processor, an optical imaging source comprising a spatially distributed plurality of photoelectric receiving elements (PERE) and configured by the processor to detect motion, and a data store operatively coupled to the processor. The data store may contain instructions that, when executed by the processor, cause the processor to perform operations that include comparing, for each of the plurality of PERE, values of the PERE processed by the optical imaging source to a predetermined minimum value; determining, for each of the PERE, a frame differential image (FDI) value based on the comparisons; determining an amount of change based on an analysis of a difference between an FDI value at a first time and an FDI value at a second time; comparing the determined amount of change with a predetermined threshold; and generating a signal that indicates a jam state or a motion state based on the comparison.

In some embodiments, the monitor system may include an application specific integrated circuit (ASIC) including an interface for connection to the processor. The ASIC may include circuitry for controlling operations of the processor.

In one exemplary embodiment, a method of non-contact motion detection may include the sampling of a target object by an optical imaging source that has a plurality of temporally separated photoelectric receiving elements (PERE); determining, for each of the plurality of PERE, a frame differential image (FDI) value; comparing corresponding FDI values of the temporally separated pixel images; assessing whether or not the FDI values are less than a predetermined threshold value; and generating a jam state signal responsive to one or more FDI values being less than the predetermined threshold value for a predetermined period of time.

In some embodiments, comparing corresponding frame differential image (FDI) values may include summing the square of a difference between the current FDI value and a previous FDI value.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. An apparatus comprising:
   a processor; and,
   a data store operatively coupled to the processor and containing instructions that, when executed by the processor, cause the processor to perform operations to detect a jam state of a target object being transported by a conveyor system,
   wherein the operations comprise:
   (a) receive, for each of a spatially distributed plurality of photoelectric receiving elements (PERE), a first image signal generated based on a first detection signal at a first one of a plurality of temporally-spaced detection times and a second image signal generated based on a second detection signal at a second one of the plurality of temporally-spaced detection times, wherein:
      the first image signal and the second image signal are indicative of a motion of the target object, and
      the plurality of PERE are each configured to generate a detection signal at least as a function of an intensity of a reflection of a linear optical beam off of the target object, the reflection being incident on a corresponding detection surface of at least one of the plurality of PERE,
      the linear optical beam being launched from an optical imaging source towards the target object;
   (b) compare the first image signal to the second image signal;
   (c) based on the comparison, determine a frame differential image (FDI) value indicative of a measure of movement of the target object from the first detection time to the second detection time; and,
   (d) if the determined FDI value is less than a predetermined threshold, then generate a jam detection signal.

2. The apparatus of claim 1, the operations further comprising:
   (c1) repeating steps (a)-(c) at least a predetermined number of times to determine an FDI value as a function of each of the FDI determinations.

3. The apparatus of claim 1, wherein generating the first image signal and the second image signal comprises subtracting an ambient light level associated with background light incident on the corresponding detection surface at the first detection time and at the second detection time, respectively.

4. The apparatus of claim 3, wherein subtracting the ambient light level associated with background light incident on the corresponding detection surface comprises adjusting a value of the image signal to zero if the image signal is less than a predetermined minimum signal threshold for each of the image signals associated with each of the plurality of PERE.

5. The apparatus of claim 1, wherein comparing the image signal at the first detection time to the image signal at the second detection time comprises summing the squares of the differences between each of the respective image signals at the first detection time to the corresponding image signals at the second detection time.

6. The apparatus of claim 1, wherein the optical imaging source comprises a one-dimensional laser source.

7. The apparatus of claim 1, wherein the operations further comprise receiving, via the spatially distributed plurality of photoelectric receiving elements (PERE), a distance measurement to the target object.

8. The apparatus of claim 7, wherein the operations further comprise generating the jam detection signal only if the received distance measurement to the target object is within a predetermined qualified range.

9. The apparatus of claim 1, wherein a value of the image signal is adjusted to zero if the image signal is less than a predetermined minimum signal threshold.

10. The apparatus of claim 1, wherein the operation to determine a frame differential image (FDI) value comprises normalizing the FDI as a function of a number of the image signal values that are non-zero.

11. The apparatus of claim 1, wherein each generated jam detection signal is a function of an intensity of the corresponding reflection of the linear optical beam off of the target object.

12. The apparatus of claim 1, wherein each of a plurality of temporally spaced detection times comprises a corresponding time interval during which each of the corresponding jam detection signals are generated.

13. The apparatus of claim 1, wherein the spatially distributed plurality of photoelectric receiving elements (PERE) comprises a linear array of PERE.

14. The apparatus of claim 1, wherein the spatially distributed plurality of photoelectric receiving elements (PERE) comprises a two-dimensional array of PERE.

15. A monitor system for non-contact motion detection comprising:
   a processor; and
   a data store operatively coupled to the processor and containing instructions that, when executed by the processor, cause the processor to perform operations comprising:
      comparing, for each of a spatially distributed plurality of photoelectric receiving elements (PERE), values of the PERE processed by an optical imaging source to a predetermined minimum value, wherein the optical imaging source comprises the spatially distributed plurality of PERE and is configured by the processor to detect motion in a monitored environment;

determining, for each of the PERE, a frame differential image (FDI) value based on the comparisons;

determining an amount of change based on an analysis of a difference between an FDI value at a first time and an FDI value at a second time;

comparing the determined amount of change with a predetermined threshold; and generating a signal that indicates a jam state of the monitored environment when the comparison meets at least one predetermined criterion.

16. The apparatus of claim 1, further comprising the optical imaging source, the optical imaging source comprising the plurality of PERE.

17. The apparatus of claim 15, further comprising the optical imaging source, the optical imaging source comprising the plurality of PERE.

18. The monitor system of claim 15, further comprising an application specific integrated circuit (ASIC) comprising:
an interface for connection to the processor, and
circuitry for controlling operations of the processor.

19. The monitor system of claim 15, further comprising the optical imaging source, the optical imaging source comprising the plurality of PERE.

20. The monitor system of claim 19, wherein the detection signal processing module comprises an analog-to-digital converter.

21. The monitor system of claim 19, wherein the detection signal processing module and the processor further comprise a microcontroller.

* * * * *